Jan. 15, 1924.　　　　　J. EARLE　　　　　1,480,999
AUTO TIRE NONSKID DEVICE
Filed March 22, 1922
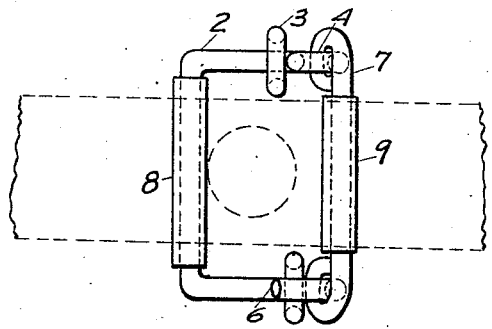
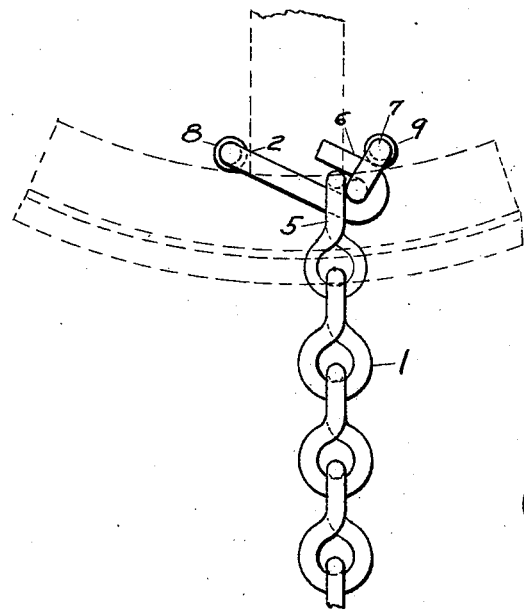
Fig. 1
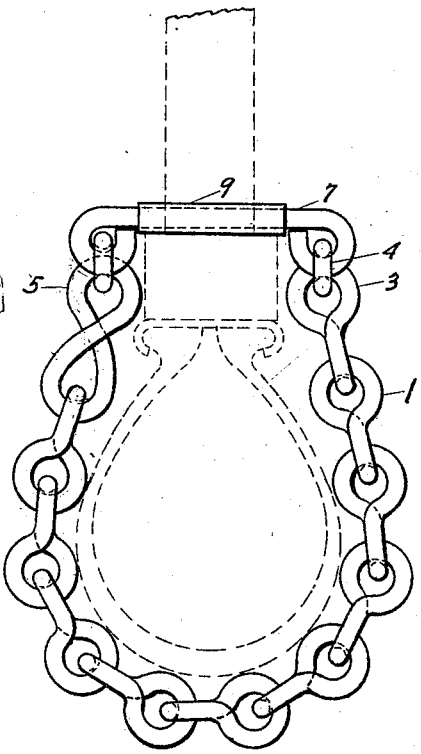
Fig. 3.
INVENTOR
John Earle
BY Myron J Dikeman
ATTORNEY

Patented Jan. 15, 1924.                                              1,480,999

UNITED STATES PATENT OFFICE.

JOHN EARLE, OF WINDSOR, ONTARIO, CANADA, ASSIGNOR OF ONE-THIRD TO ROBERT Y. OGG, ONE-THIRD TO ROBERT O. McCARTHY, AND ONE-THIRD TO ARTHUR C. McCARTHY, ALL OF DETROIT, MICHIGAN.

AUTO TIRE NONSKID DEVICE.

Application filed March 22, 1922. Serial No. 545,893.

*To all whom it may concern:*

Be it known that I, JOHN EARLE, a citizen of the United States of America, residing in the city of Windsor, county of Essex, Province of Ontario, Dominion of Canada, have invented certain new and useful Improvements in an Auto Tire Nonskid Device, and declare the following to be a full, clear, and exact description of the same, such as will enable others skilled in the art to which it pertains to make and use the same, reference being had to the accompanying drawings, which form a part of these specifications.

The object of my invention is to provide an antiskid device that can be attached to the wheel of an automobile, wrapping around the tire to prevent the wheel from slipping when in mud or on slippery roads.

Another object of my invention is to provide a non-skid device that can be applied to the wheel at any time, and when the wheel may be settled in the mud or rut, by attaching the separate chains at different places on the wheel and which will prevent slipping of the wheel and allow the driver to remove the car by the power of the engine.

A further object is to provide a single non-skid device that can be easily attached to the wheel and securely locked without the use of a key or spring and may be easily removed from the wheel when its use is not required.

A still further object is to provide a non-skid device that will operate efficiently and can be manufactured at a low cost.

These several objects are secured in their preferred form by the construction and arrangement of parts as are more fully hereinafter set forth.

Similar parts on all drawings are marked by similar numerals.

Fig. 1, shows a side view of the non-skid device as it is attached to the rim of an auto wheel, and locked to a spoke.

Fig. 2, is a top view showing the means of locking the chain to the felly of the wheel and its relative position thereon.

Fig. 3 is a cross sectional view through the tire, rim and felly, showing the chain in applied position.

I will now describe in detail, the construction and working parts of my invention, referring to the accompanying drawings and the reference characters thereon.

The general construction of the non-skid device is a short piece of medium sized chain, connected at the ends by a hooked lock in such a manner that the chain may be wrapped about the rim and tire of the auto wheel at any place, and securely fastened by hooking the lock bars together.

The chain section —1— may be made of any size or shaped links as desired, and of any suitable grade of iron or steel, but should be of a size to allow the chain to firmly grip the soil and embed therein sufficiently to prevent slipping of the wheel when the power of the motor is connected therewith. Too large sized chain would be undesirable as causing a jar as each section of the chain comes in contact with the ground, also the large chain will tend to injure the rubber tire, while a too small section for the chain will be inoperative not having sufficient surface to grip the soil and resist the slipping of the wheel. One end of the chain is connected to the yoke —2— of the locking bars, by means of link —3— being placed thereon before the end ring —4— is turned in the yoke. The loose end of the chain is then attached to the other side of the yoke —2—, by hooking the end link —5— over the open hook —6— in the yoke.

The locking bars for clamping and holding the chain in place on the wheel comprises the yoke —2— and the locking bar —7—, so arranged and shaped as to fit over the rim of the wheel and surround the spoke as indicated in Fig. 1. The yoke —2— is made U-shaped, and carries a rubber or fiber covering —8— placed thereon to prevent the lock bar from marring the felly of the wheel when under pressure of the loaded chain, and is of sufficient width to pass over the felly, the ends being bent backward to surround the spoke as indicated in Fig. 2. In one of the ends of yoke —2— is formed a closed ring —4— to which is securely hinged the lock bar —7—, the end link —3— of the non-skid chain being placed on the yoke arm before forming the ring —4— therein. The other end of the yoke is formed into a long open hook —6— as shown in Fig. 1, and is made of sufficient size and length to receive both the lock bar —7— and the end link —5— of the skid chain. The bar —7— is made having a closed loop or ring in each end, and hinged to the yoke —2— at one end, through the ring —4—, and also carries a rubber or fiber covering —9— thereon to prevent marring the felly of the wheel.

In placing the non-skid device on the wheel, the yoke —2— is hooked over the spoke next to the felly, and the loose chain wrapped around the tire, hooking the end link —5— over the long hook —6— in the yoke, and sliding same back on the arm of the yoke —2— clear from the end of the hook, allowing the lock bar —7— to be placed over hook —6— and slid to the outer end of the yoke as indicated in Fig. 1. The end link —5— of the chain, is slid back in place in the hook and allowed to draw tight against the side of the lock bar —7—. Any load or pressure caused by the turning of the wheel against the chain —1—, draws the end link —5— firmly against the lock bar —7— which prevents same from being disconnected. The load from the chain being divided between the lock bar and the yoke, no pressure could be attained from the action of the wheel, to force the lock open.

The removal of the non-skid device is made by simply sliding the end link —5— back on the yoke arm, and unhooking the lock bar —7— from the yoke, then removing the end link which allows the chain to be removed.

The non-skid device can be made of various sizes to fit the different sized wheels, and when using, several of the chains may be attached to the wheel at various places along the rim, and as near together as may be required to prevent slipping of the tire on the ground.

Having fully described my tire non-skid device, what I claim as my invention and desire to secure by Letters Patent is.

1. A tire non-skid device substantially as described comprising a single tire chain, a felly yoke with a hook on one end, a locking bar hinged to the other end of said yoke for engaging the aforesaid hook, the end links being used for attaching both ends of the chain to the felly yoke.

2. A tire non-skid device of the character described comprising a single tire chain, a felly yoke having one end of the chain permanently attached thereto, and provided with a closed ring at one end of the yoke and a hook at the other end thereof, a locking bar hinged to the closed end of the yoke, means for attaching the loose end of the locking bar to the hook end of the yoke, a covering for both yoke and locking bar to prevent marring the felly, means for locking said bar in the yoke hook by attaching the loose end of the tire chain ahead of the said locking bar to be acted upon by the resisting load of the turning wheel against the chain, thus securely locking the tire chain and yoke to the wheel.

In witness whereof I sign these specifications.

JOHN EARLE.